(12) United States Patent
Park et al.

(10) Patent No.: US 9,037,984 B2
(45) Date of Patent: May 19, 2015

(54) DISPLAY APPARATUS FOR DISPLAYING WIDGET WINDOWS, DISPLAY SYSTEM INCLUDING THE DISPLAY APPARATUS, AND A DISPLAY METHOD THEREOF

(75) Inventors: Da-hye Park, Incheon (KR); Hyun-cheol Park, Suwon-si (KR); Joon-kyu Seo, Seoul (KR); Hee-jeong Bae, Suwon-si (KR); Jong-chan Park, Seoul (KR); Yoon-ji Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1101 days.

(21) Appl. No.: 12/273,191

(22) Filed: Nov. 18, 2008

(65) Prior Publication Data

US 2009/0300146 A1 Dec. 3, 2009

(30) Foreign Application Priority Data

May 27, 2008 (KR) ........................ 10-2008-0049222

(51) Int. Cl.
| | |
|---|---|
| *G06F 3/0484* | (2013.01) |
| *H04N 5/445* | (2011.01) |
| *H04N 21/431* | (2011.01) |
| *H04N 21/435* | (2011.01) |
| *H04N 21/462* | (2011.01) |
| *H04N 21/485* | (2011.01) |
| *H04N 21/488* | (2011.01) |
| *H04N 21/81* | (2011.01) |
| *H04N 5/45* | (2011.01) |

(52) U.S. Cl.
CPC .............. *H04N 5/44591* (2013.01); *H04N 5/45* (2013.01); *H04N 21/4316* (2013.01); *H04N 21/435* (2013.01); *H04N 21/4622* (2013.01); *H04N 21/4858* (2013.01); *H04N 21/488* (2013.01); *H04N 21/8126* (2013.01); *H04N 21/8173* (2013.01)

(58) Field of Classification Search
CPC ............ G06F 3/0484; G06F 17/30899; G06F 17/30905
USPC .......................................................... 715/760
See application file for complete search history.

(56) References Cited

U.S. PATENT DOCUMENTS 4,831,556 A * 5/1989 Oono ............................ 715/786
5,371,847 A * 12/1994 Hargrove ...................... 715/788
(Continued)

FOREIGN PATENT DOCUMENTS

| KR | 10-2004-0039003 A | 5/2004 |
|---|---|---|
| KR | 10-0747663 B1 | 8/2007 |

OTHER PUBLICATIONS

Communication dated May 2, 2014, issued by the Korean Intellectual Property Office in counterpart Korean Application No. 10-2008-0049222.

*Primary Examiner* — Reza Nabi
(74) *Attorney, Agent, or Firm* — Sughrue Mion, PLLC

(57) ABSTRACT

A method for displaying widget windows is provided, including generating a widget display screen including at least one widget window, determining if a display area of the at least one widget window satisfies a preset threshold condition, and adding a new widget display screen including a new widget window if the threshold condition is satisfied. Accordingly, services can be provided through widget windows without preventing the viewer from viewing the TV, thereby enhancing user convenience.

15 Claims, 7 Drawing Sheets

(56) References Cited

U.S. PATENT DOCUMENTS

| | | | | |
|---|---|---|---|---|
| 5,577,187 A | * | 11/1996 | Mariani | 715/792 |
| 5,712,995 A | * | 1/1998 | Cohn | 715/792 |
| 5,760,772 A | * | 6/1998 | Austin | 715/798 |
| 5,838,318 A | * | 11/1998 | Porter et al. | 715/790 |
| 6,008,809 A | * | 12/1999 | Brooks | 715/792 |
| 6,473,102 B1 | * | 10/2002 | Rodden et al. | 715/788 |
| 6,724,403 B1 | * | 4/2004 | Santoro et al. | 715/765 |
| 6,791,529 B2 | * | 9/2004 | Shteyn | 345/156 |
| 6,806,892 B1 | * | 10/2004 | Plow et al. | 715/781 |
| 6,832,355 B1 | * | 12/2004 | Duperrouzel et al. | 715/788 |
| 7,188,317 B1 | * | 3/2007 | Hazel | 715/804 |
| 7,216,302 B2 | * | 5/2007 | Rodden et al. | 715/815 |
| 7,336,279 B1 | * | 2/2008 | Takiguchi | 345/473 |
| 7,546,543 B2 | * | 6/2009 | Louch et al. | 715/762 |
| 7,954,064 B2 | * | 5/2011 | Forstall et al. | 715/779 |
| 8,302,020 B2 | * | 10/2012 | Louch et al. | 715/764 |
| 8,316,312 B2 | * | 11/2012 | Kim et al. | 715/765 |
| 2002/0186257 A1 | * | 12/2002 | Cadiz et al. | 345/838 |
| 2004/0078814 A1 | * | 4/2004 | Allen | 725/47 |
| 2004/0090470 A1 | * | 5/2004 | Kim et al. | 345/846 |
| 2004/0261038 A1 | * | 12/2004 | Ording et al. | 715/792 |
| 2005/0060665 A1 | * | 3/2005 | Rekimoto | 715/810 |
| 2005/0125742 A1 | * | 6/2005 | Grotjohn et al. | 715/799 |
| 2005/0216332 A1 | * | 9/2005 | Lewin | 705/12 |
| 2006/0005187 A1 | * | 1/2006 | Neil | 718/1 |
| 2006/0184891 A1 | * | 8/2006 | Parker et al. | 715/767 |
| 2006/0218502 A1 | * | 9/2006 | Matthews et al. | 715/779 |
| 2006/0277469 A1 | * | 12/2006 | Chaudhri et al. | 715/709 |
| 2007/0002377 A1 | * | 1/2007 | Tokunaga | 358/1.18 |
| 2007/0061724 A1 | * | 3/2007 | Slothouber et al. | 715/716 |
| 2007/0101297 A1 | * | 5/2007 | Forstall et al. | 715/765 |
| 2007/0118813 A1 | * | 5/2007 | Forstall et al. | 715/805 |
| 2007/0130541 A1 | * | 6/2007 | Louch et al. | 715/804 |
| 2007/0220440 A1 | * | 9/2007 | Song et al. | 715/776 |
| 2008/0009344 A1 | * | 1/2008 | Graham et al. | 463/25 |
| 2008/0010133 A1 | * | 1/2008 | Pyhalammi et al. | 705/14 |
| 2008/0034309 A1 | * | 2/2008 | Louch et al. | 715/766 |
| 2008/0034314 A1 | * | 2/2008 | Louch et al. | 715/778 |
| 2008/0120658 A1 | * | 5/2008 | Cubillo | 725/91 |
| 2008/0120664 A1 | * | 5/2008 | Kassam et al. | 725/110 |
| 2008/0168367 A1 | * | 7/2008 | Chaudhri et al. | 715/764 |
| 2008/0168368 A1 | * | 7/2008 | Louch et al. | 715/764 |
| 2008/0168382 A1 | * | 7/2008 | Louch et al. | 715/781 |
| 2008/0256439 A1 | * | 10/2008 | Boreham et al. | 715/246 |
| 2008/0263472 A1 | * | 10/2008 | Thukral et al. | 715/774 |
| 2008/0294998 A1 | * | 11/2008 | Pyhalammi et al. | 715/748 |
| 2009/0017872 A1 | * | 1/2009 | Myers et al. | 455/566 |
| 2009/0089668 A1 | * | 4/2009 | Magnani et al. | 715/273 |
| 2009/0100384 A1 | * | 4/2009 | Louch | 715/863 |
| 2009/0172746 A1 | * | 7/2009 | Aldrey et al. | 725/61 |
| 2009/0216634 A1 | * | 8/2009 | Peltonen et al. | 705/14 |
| 2009/0217186 A1 | * | 8/2009 | Pyhalammi et al. | 715/764 |
| 2009/0228824 A1 | * | 9/2009 | Forstall et al. | 715/779 |
| 2009/0254860 A1 | * | 10/2009 | Seo et al. | 715/810 |
| 2009/0282358 A1 | * | 11/2009 | Park et al. | 715/781 |
| 2009/0300146 A1 | * | 12/2009 | Park et al. | 709/219 |
| 2009/0303676 A1 | * | 12/2009 | Behar et al. | 361/679.27 |
| 2010/0011316 A1 | * | 1/2010 | Sar et al. | 715/784 |
| 2010/0011394 A1 | * | 1/2010 | Lee et al. | 725/40 |
| 2010/0017825 A1 | * | 1/2010 | Shin et al. | 725/47 |
| 2010/0077328 A1 | * | 3/2010 | Berg et al. | 715/764 |
| 2010/0211886 A1 | * | 8/2010 | Forstall et al. | 715/745 |
| 2010/0222102 A1 | * | 9/2010 | Rodriguez | 455/557 |
| 2010/0242110 A1 | * | 9/2010 | Louch et al. | 726/22 |
| 2010/0257559 A1 | * | 10/2010 | Friedlander et al. | 725/40 |
| 2010/0287501 A1 | * | 11/2010 | Seong et al. | 715/810 |
| 2011/0197165 A1 | * | 8/2011 | Filippov et al. | 715/841 |
| 2013/0042191 A1 | * | 2/2013 | Kim et al. | 715/765 |
| 2013/0290858 A1 | * | 10/2013 | Beveridge | 715/740 |
| 2013/0332886 A1 | * | 12/2013 | Cranfill et al. | 715/835 |

\* cited by examiner

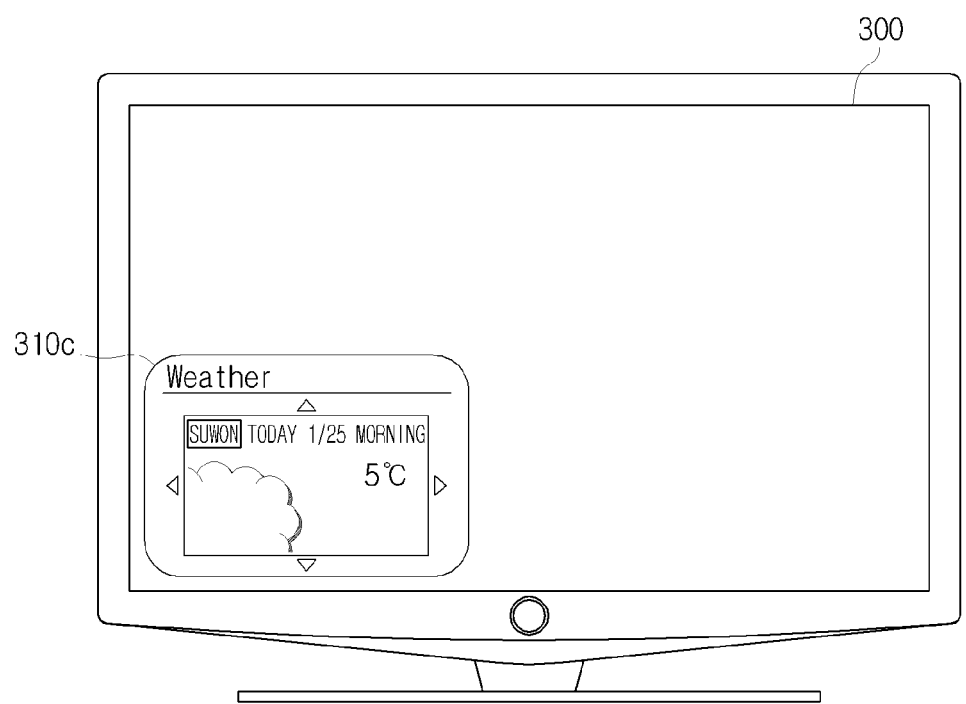

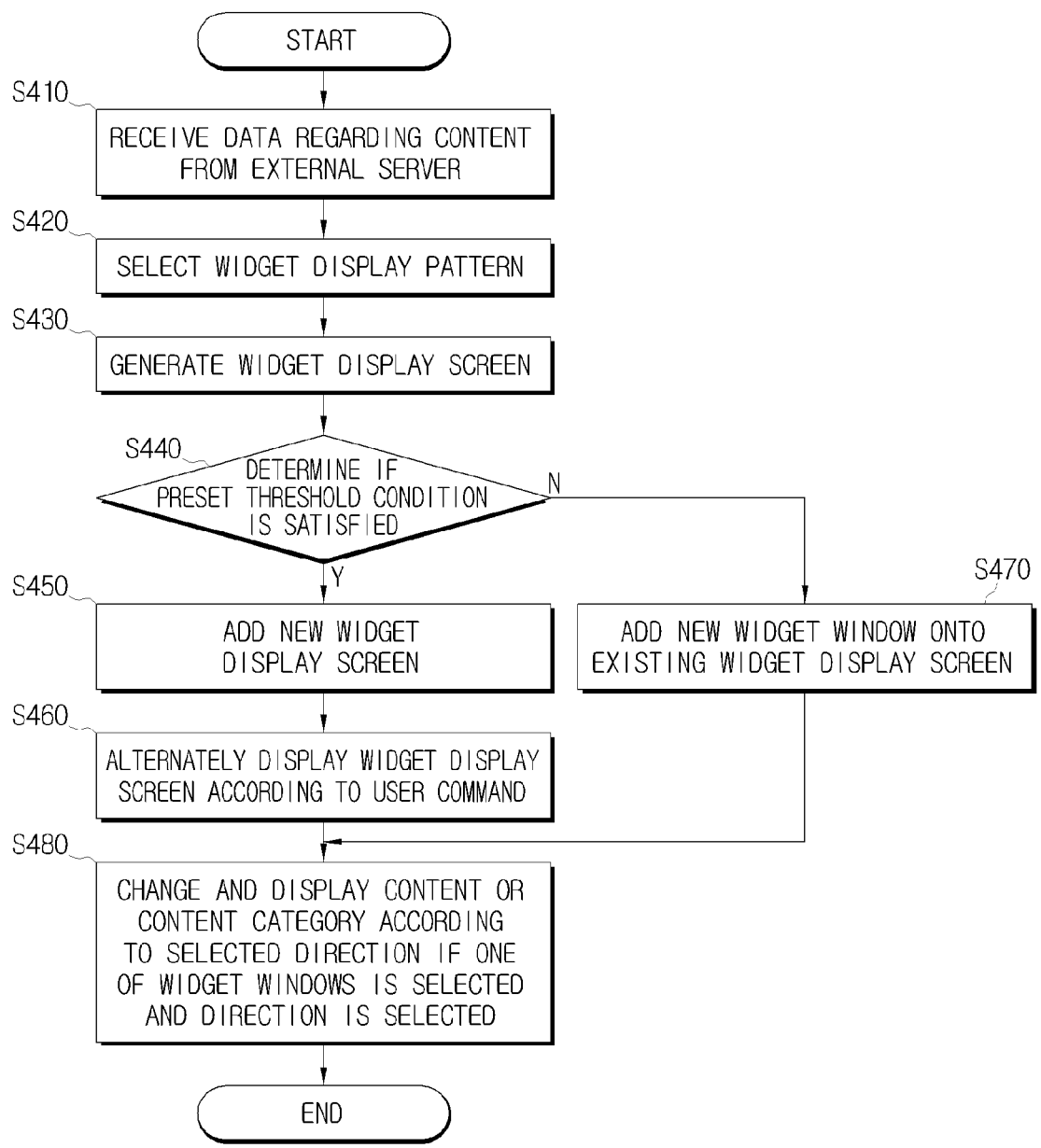

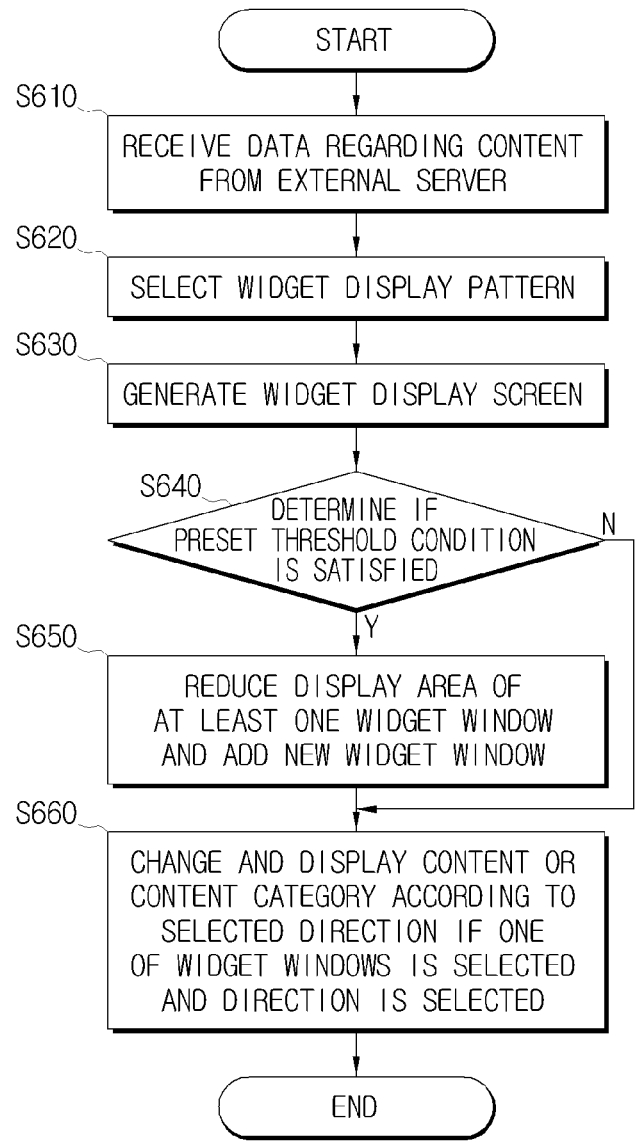
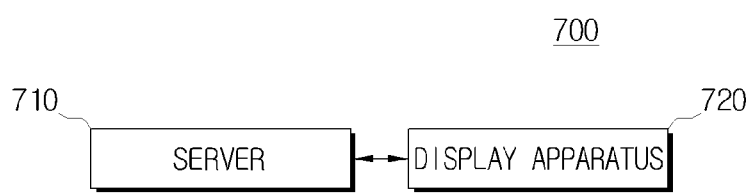

DISPLAY APPARATUS FOR DISPLAYING WIDGET WINDOWS, DISPLAY SYSTEM INCLUDING THE DISPLAY APPARATUS, AND A DISPLAY METHOD THEREOF

CROSS-REFERENCE TO RELATED APPLICATIONS

This application claims priority from Korean Patent Application No. 10-2008-0049222, filed on May 27, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus which displays widget windows, a display system including the display apparatus, and a display method thereof, and more particularly, to a display apparatus which displays widget windows without preventing a viewer from viewing a television, a display system including the display apparatus, and a display method thereof.

2. Description of the Related Art

In general, web adoption models for Internet Protocol Television (IPTV) includes an open web scheme of taking information of a web format provided by a service provider, a digital television portal scheme of providing viewers with IPTV-based web services through cooperation between IPTV providers and service providers, and a widget scheme of receiving only contents provided by a service provider and displaying the contents on small windows. Among these schemes, the widget scheme, in which multitasking is enabled while viewing TV and users instead of a service provider can directly manage widget services, is most suitable for the web adoption model for IPTV.

The widget (or gadget) is a mini program (application) which generates an icon for a frequently used service and independently drives the service. Using the widgets, contents can be provided without opening a web browser and various application programs such as a clock can be independently driven.

However, if a plurality of widget programs are executed and displayed on the screen of the IPTV, the widget programs may interfere with the IPTV viewer's ability to view the IPTV.

Therefore, there is a need for methods to provide a display apparatus which displays widget windows without preventing the viewer from viewing the television.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a display apparatus which efficiently displays widget windows, thereby minimizing inconvenience in viewing a TV, a display system including the display apparatus, and a display method thereof According to an exemplary aspect of the present invention, there is provided a display method including generating a widget display screen including at least one widget window, determining if a display area of the at least one widget window satisfies a preset threshold condition, and adding a new widget display screen including a new widget window if the threshold condition is satisfied.

The method may further include receiving data regarding a content to be executed on the widget window from an external server which provides contents.

The method may further include alternately displaying the generated widget display screen and the new widget display screen according to a user command.

The threshold condition may be at least one of when a number of widget windows exceeds a threshold value which represents a number of widget windows allowable in a single widget display screen and when the size of the display area of the at least one widget window with respect to the entire widget display screen exceeds a preset threshold rate.

In the determining operation, it may be determined if the display area of the at least one widget window satisfies the threshold condition if a request for adding a widget window is input.

The method may further include adding the new widget window onto the generated widget display screen if the threshold condition is not satisfied.

In the adding operation, a user interface window to ask a user whether to add a new widget display screen may be provided if the threshold condition is satisfied.

The method may further include if one of the at least one widget window is selected and a direction is selected, changing and displaying a content or a content category which is provided by the selected widget window according to the selected direction.

The method may further include receiving selection of a widget display pattern, wherein a widget display pattern of the newly added widget display screen is the same as the widget display pattern of the generated widget display screen.

An aspect of the present invention provides a display method, including generating a widget display screen including at least one widget window, determining if a display area of the at least one widget window satisfies a preset threshold condition, and reducing the display area of the at least one widget window if the threshold condition is satisfied.

The method may further include receiving data regarding a content to be executed on the widget window from an external server which provides contents.

The threshold condition may be at least one of when a number of widget windows exceeds a threshold value which represents a number of widget windows allowable in a single widget display screen and when the size of the display area of the at least one widget window with respect to the entire widget display screen exceeds a preset threshold rate.

In the determining operation, it may be determined if the display area of the at least one widget window satisfies the threshold condition if a request for adding a widget window is input, and in the reducing operation, the display area of the at least one widget window is reduced if the threshold condition is satisfied.

In the reducing operation, if the threshold condition is satisfied, the display area of the at least one widget window may be reduced and a user interface window to ask a user whether to add a new widget window is provided.

The method may further include if one of the at least one widget window is selected and a direction is selected, changing and displaying a content or a content category which is provided by the selected widget window according to the selected direction.

The method may further include receiving selection of a widget display pattern wherein the new widget window is displayed on the generated widget display screen in the selected widget display pattern.

According to another exemplary aspect of the present invention, there is provided a display apparatus, including a generation unit which generates a widget display screen including at least one widget window, a determination unit which determines if a display area of the at least one widget window satisfies a preset threshold condition, and a control unit which adds a new widget display screen including a new widget window if the threshold condition is satisfied.

The control unit may alternately display the generated widget display screen and the new widget display screen according to a user command.

The threshold condition may be at least one of when a number of widget windows exceeds a threshold value which represents a number of widget windows allowable in a single widget display screen and when the size of the display area of the at least one widget window with respect to the entire widget display screen exceeds a preset threshold rate.

The determination unit may determine if the display area of the at least one widget window satisfies the threshold condition if a request for adding a widget window is input.

The control unit may add the new widget window onto the generated widget display screen if the threshold condition is not satisfied.

The control unit may provide a user interface window to ask a user whether to add a new widget display screen is provided if the threshold condition is satisfied.

If one of the at least one widget window is selected and a direction is selected, the control unit may change and display a content or a content category which is provided by the selected widget window according to the selected direction.

The apparatus may further include an input unit which receives selection of a widget display pattern, wherein a widget display pattern of the newly added widget display screen is the same as the widget display pattern of the generated widget display screen.

According to another exemplary aspect of the present invention, there is provided a display apparatus, including a generation unit which generates a widget display screen including at least one widget window, a determination unit which determines if a display area of the at least one widget window satisfies a preset threshold condition, and a control unit which reduces the display area of the at least one widget window if the threshold condition is satisfied.

The threshold condition may be at least one of when a number of widget windows exceeds a threshold value which represents a number of widget windows allowable in a single widget display screen and when the size of the display area of the at least one widget window with respect to the entire widget display screen exceeds a preset threshold rate.

The determination unit may determine if the display area of the at least one widget window satisfies the threshold condition if a request for adding a widget window is input, and the control unit may reduce the display area of the at least one widget window and add a new widget window if the threshold condition is satisfied.

If the threshold condition is satisfied, the control unit may reduce the display area of the at least one widget window and provide a user interface window to ask a user whether to add the new widget window.

If one of the at least one widget window is selected and a direction is selected, the control unit may change and display a content or a content category which is provided by the selected widget window according to the selected direction.

The apparatus may further include an input unit which receives selection of a widget display pattern.

According to another exemplary aspect of the present invention, there is provided a display system, including a server which provides data regarding a content to be executed on a widget window, and a display apparatus which receives the data regarding the content from the server, generates a widget display screen including at least one widget window, determines if a display area of the at least one widget window satisfies a preset threshold condition, and adds a new widget display screen including a new widget window if the threshold condition is satisfied.

The display apparatus may receive the data regarding the content from the server, and receive a user command to generate the widget display screen including the at least one widget window through an on-screen display (OSD).

According to another exemplary aspect of the present invention, there is provided a display system, including a server which provides data regarding a content to be executed on a widget window, and a display apparatus which receives the data regarding the content from the server, generates a widget display screen including at least one widget window, determines if a display area of the at least one widget window satisfies a preset threshold condition, and reduces the display area of the at least one widget window if the threshold condition is satisfied.

BRIEF DESCRIPTION OF THE DRAWINGS

The above and/or other aspects of the present invention will be more apparent by describing certain exemplary embodiments of the present invention with reference to the accompanying drawings, in which:

FIGS. 3A to 3C illustrate examples of a widget display screen on which a content provided by a selected widget window or a content category of the widget window changes;

FIG. 4 is a flow chart illustrating a method for displaying widget windows on a widget display screen according to an exemplary embodiment of the present invention;

FIG. 6 is a flow chart illustrating a method for displaying widget windows on a widget display screen according to an exemplary embodiment of the present invention; and FIG. 7 is a schematic block diagram of a display system according to an exemplary embodiment of the present invention.

DETAILED DESCRIPTION OF EXEMPLARY EMBODIMENTS OF THE INVENTION

Figure 1:
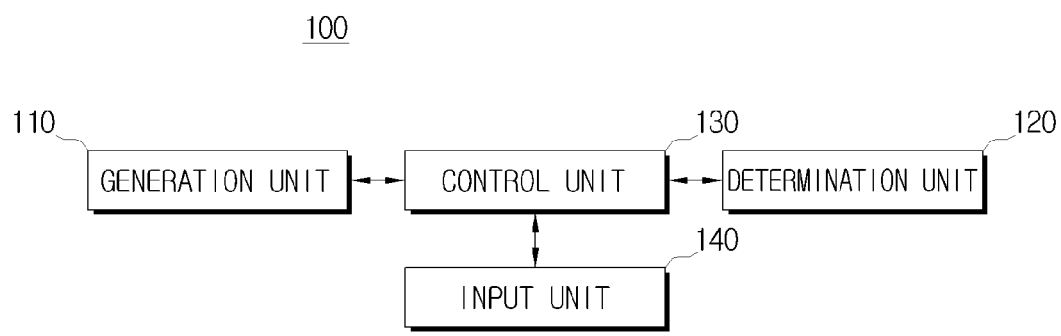
FIG. 1 is a schematic block diagram of a display apparatus which displays widget windows according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of a display apparatus which displays widget windows according to an exemplary embodiment of the present invention. As shown in FIG. 1, the display apparatus 100 includes a generation unit 110, a determination unit 120, a control unit 130, and an input unit 140.

The generation unit 110 generates a widget display screen including at least one widget window. A widget or gadget is a mini program (application) which generates an icon for a frequently used service and independently drives the service. Using widget windows, service contents such as a clock and a news flash can be displayed.

The determination unit 120 determines if a display area of the at least one widget window satisfies a preset threshold condition. The threshold condition can be satisfied when the number of widget windows which are displayable on a single screen exceeds an allowable threshold value or when the size of the display area of the widget window with respect to the entire widget display screen exceeds a threshold rate.

If the display area of the at least one widget window on the widget display screen generated by the generation unit 110 satisfies the threshold condition, the control unit 130 can display a new widget display screen including a new widget window even if a user does not input a request for adding a widget window.

If the display area of the at least one widget window on the widget display screen generated by the generation unit 110 does not satisfy the threshold condition, the determination unit 120 can determine if the threshold condition is satisfied after receiving a request for adding a widget window from the user.

If the threshold condition is satisfied, the control unit 130 adds a new widget display screen including a new widget window. In addition, if the threshold condition is satisfied, the control unit 130 may provide the user with a user interface window to ask whether to add a new widget display screen including a new widget window. Accordingly, even when the threshold condition is satisfied, a new widget display screen may not be added according to the user's selection.

If the threshold condition is not satisfied when a request for adding a widget window is input, the control unit 130 may add a new widget window onto the existing widget display screen instead of adding a new widget display screen.

Using the input unit 140, the user may select a widget display pattern. If the user selects a pre-stored widget display pattern using the input unit 140, the generation unit 110 generates a widget display screen including at least one widget window in the selected widget display pattern. In addition, the user may select a widget display pattern using a user interface window to display pre-stored display patterns.

The widget display pattern may be pre-stored in the display apparatus 100, and may be selected according to the user preference. The pre-stored widget display pattern may include diverse patterns of arranging widget windows at the edges of the widget display screen, arranging widget windows on the left of the widget display screen in a row, arranging widget windows at the top or the bottom of the widget display screen, and arranging widget windows at the center of the widget display screen.

Figure 2A:
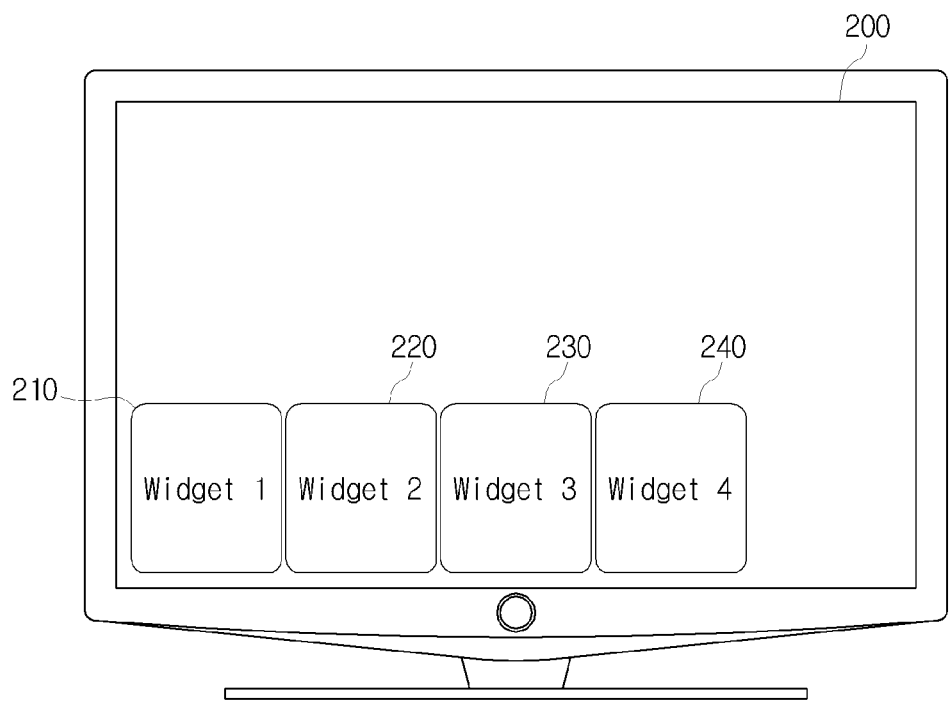
FIGS. 2A to 2C illustrate examples of a widget display screen including widget windows.
Figure 2B:
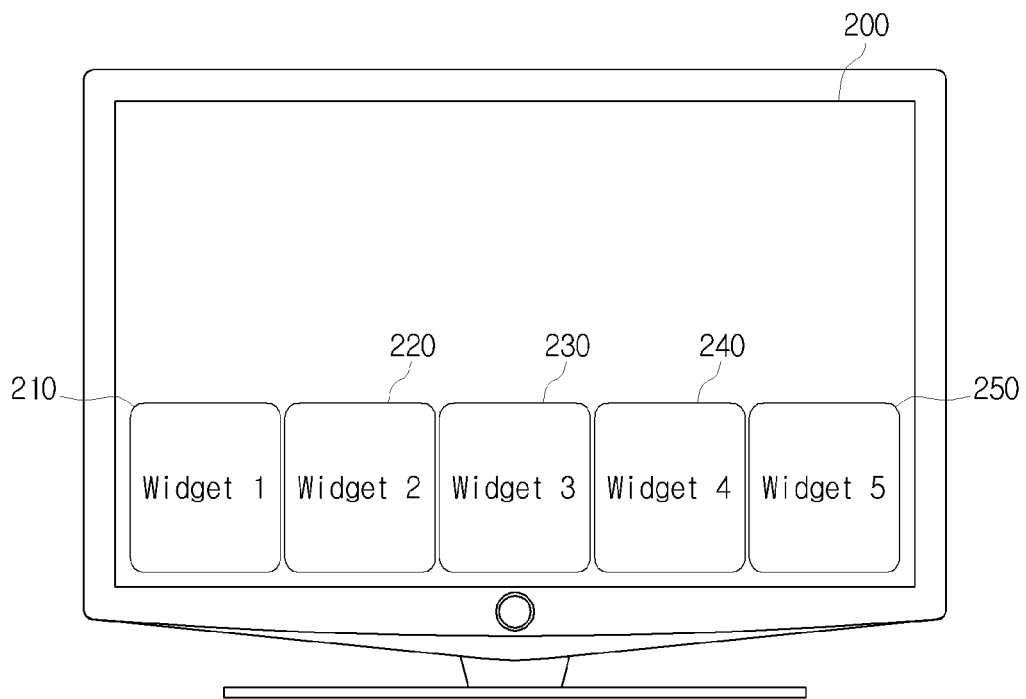
Figure 2C:
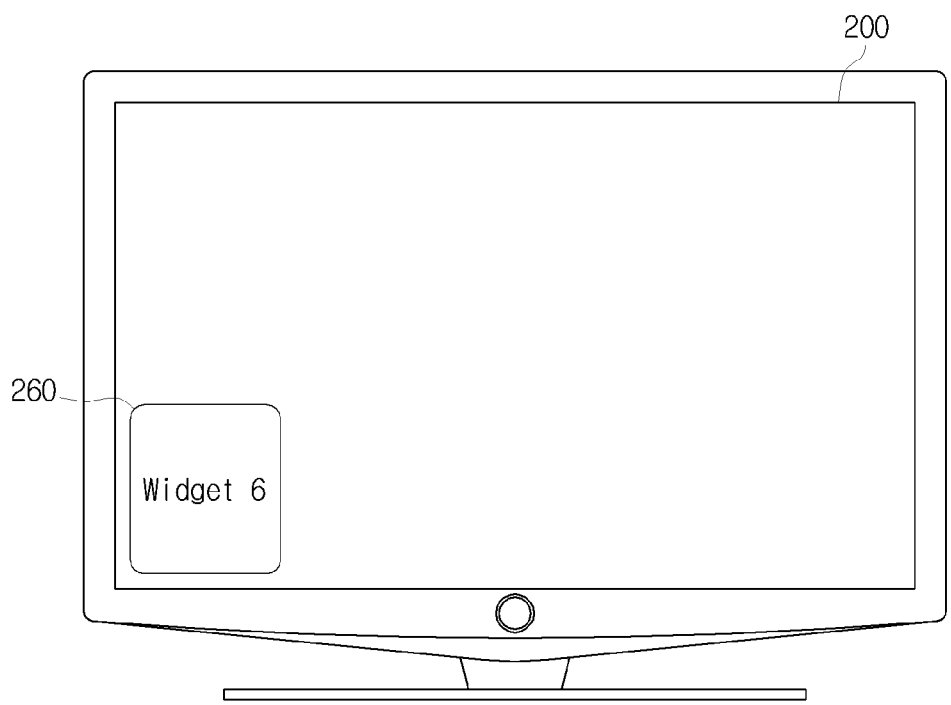

FIGS. 2A to 2C illustrate examples of a widget display screen including widget windows. With reference to FIG. 2A, a widget display screen 200 may include widget window 1 210, widget window 2 220, widget window 3 230, and widget window 4 240.

If it is assumed that the threshold condition is satisfied when a new widget window (not shown) is added to a widget display screen 200 of FIG. 2B including five widget windows 210 to 250, FIG. 2A represents a case in which the threshold condition is not satisfied. If two widget windows are added to the widget display screen 200 of FIG. 2A according to the user's request, the threshold condition is satisfied. Therefore, a new widget display screen 200 of FIG. 2C may be added to the existing display screen 200 of FIG. 2B.

In addition, unlike FIG. 2A in which the threshold condition is not satisfied, if the generation unit 110 generates six widget windows on a widget display screen from the beginning, the new widget display screen 200 of FIG. 2C in addition to the widget display screen 200 of FIG. 2B can be generated without the user's request for adding widget windows.

In this case, the threshold condition may be set to be satisfied when the widget windows with respect to the widget display screen 200 exceeds a certain rate, for example, ⅓ of the widget display screen 200. In addition, the threshold condition may be set on the basis of the number of widget windows which can be included in the widget display screen 200. That is, the threshold condition can vary according to the user preference.

The user may shift the widget display screen from the existing display screen of FIG. 2B to the newly added display screen of FIG. 2C and vice versa using a direction key or a wheel key on a remote controller.

Widget display windows in a newly added display screen as shown in FIG. 2C may be arranged in the same widget display pattern as the existing widget display screen 200 as shown in FIG. 2A or FIG. 2B. That is, as shown in FIG. 2C, added widget windows are arranged sequentially from the left of the widget display screen 200 to the right in a row. Unlike FIG. 2C, widget display windows may be arranged from the right of the widget display screen 200 to the left in a row.

Figure 3A:
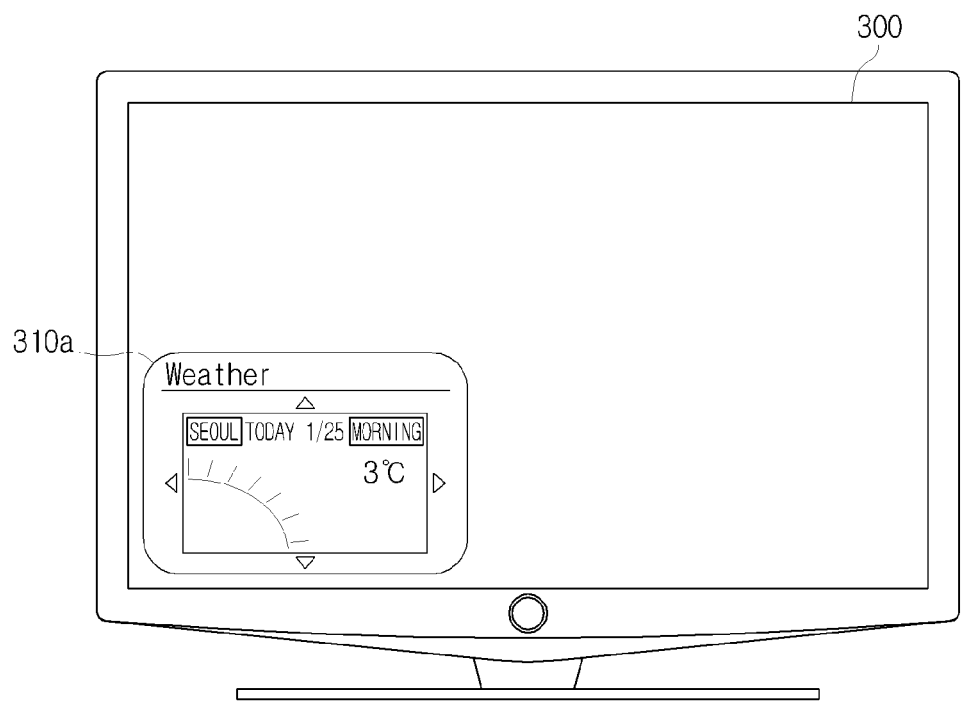
Figure 3B:
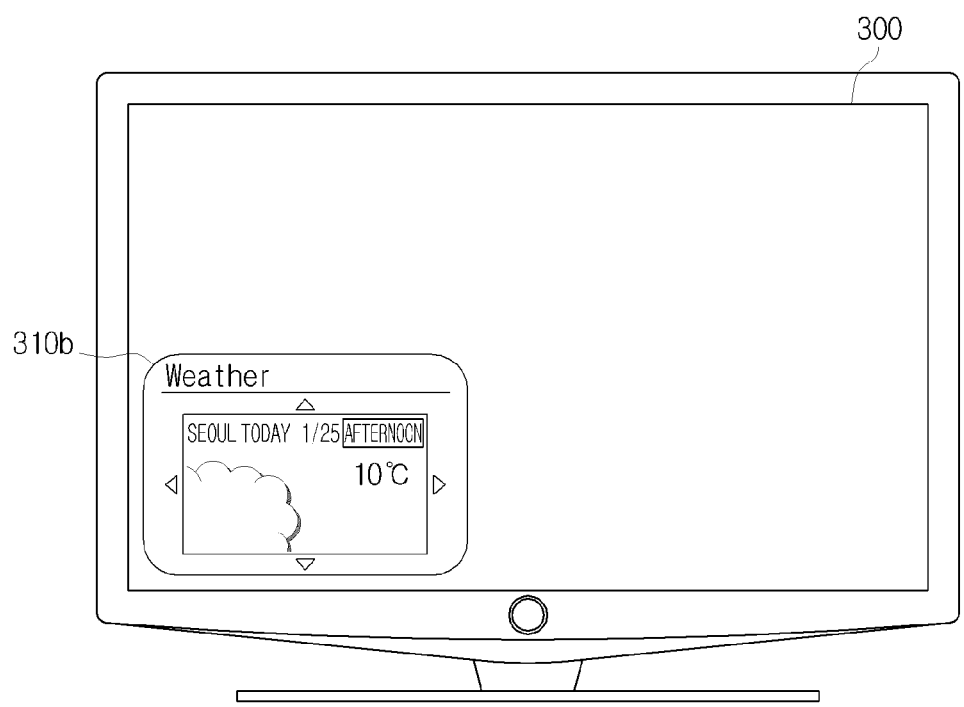

FIGS. 3A to 3C illustrate examples of a widget display screen on which a content provided by a selected widget window or a content category of the widget window changes. Widget windows may provide contents such as time information, weather information, and stock information. If the user selects one of the widget windows and selects direction using the direction key or wheel key on the remote controller, a content or a content category which is provided by the selected widget window may change according to the selected direction.

Referring to FIG. 3A, a widget window 310*a* provides weather information. If a signal corresponding to the right or left direction is input using the direction key or wheel key on the remote controller, a content or a content category regarding the time information changes. For example, when the widget window 310*a* in FIG. 3A shows "morning" weather information for Seoul, the widget window 310*b* in FIG. 3B shows "afternoon" weather information for Seoul if a signal corresponding to the right or left direction is input.

In the meantime, when the widget window 310*a* in FIG. 3A shows morning weather information for "Seoul", the widget window 310*c* in FIG. 3C shows afternoon weather information for "Suwon" if a signal corresponding to the up or down direction is input using the direction key or wheel key on the remote controller.

The positions of the widget windows 310*a*, 310*b*, and 310*c* are fixed so that weather information in conjunction with "region" can be provided according to up or down direction, and weather information in conjunction with "time" can be provided according to right or left direction. Since contents of different categories can be provided according to up, down, right, or left directions, a diverse variety of services can be provided through the widget windows 310*a*, 310*b*, and 310*c*.

FIG. 4 is a flow chart illustrating a method for displaying widget windows on a widget display screen according to an exemplary embodiment of the present invention. Referring to FIG. 4, data regarding content to be provided through a widget window are received from an external server (S410). A widget display pattern is selected (S420). In this case, the user may select one of the pre-stored diverse widget display patterns through a user interface window.

A widget display screen including at least one widget window which is arranged according to the selected widget display pattern is generated (S430).

It is determined if the generated widget display screen satisfies a preset threshold condition (S440). If the generated widget display screen satisfies the preset threshold condition (S440Y), a new widget display screen can be added (S450).

In this case, the widget display screens can be displayed alternately by shifting from the existing widget display screen and the newly added widget display screen and vice versa according to user commands (S460).

If the generated widget display screen does not satisfy the preset threshold condition (S440N), a new widget window can be added onto the generated widget display screen (S470). Operation S470 is performed only when a user command to add a widget window is input. If the widget display screen including the widget windows generated by the generation unit 100 does not satisfy the threshold condition from the beginning, operation S470 is skipped but instead operation S480 is performed.

In operation S460 or S470, if one of the widget windows is selected and a signal corresponding to a direction is input using the direction key or wheel key on the remote controller, a content or a content category can vary according to the selected direction (S480).

Figure 5A:
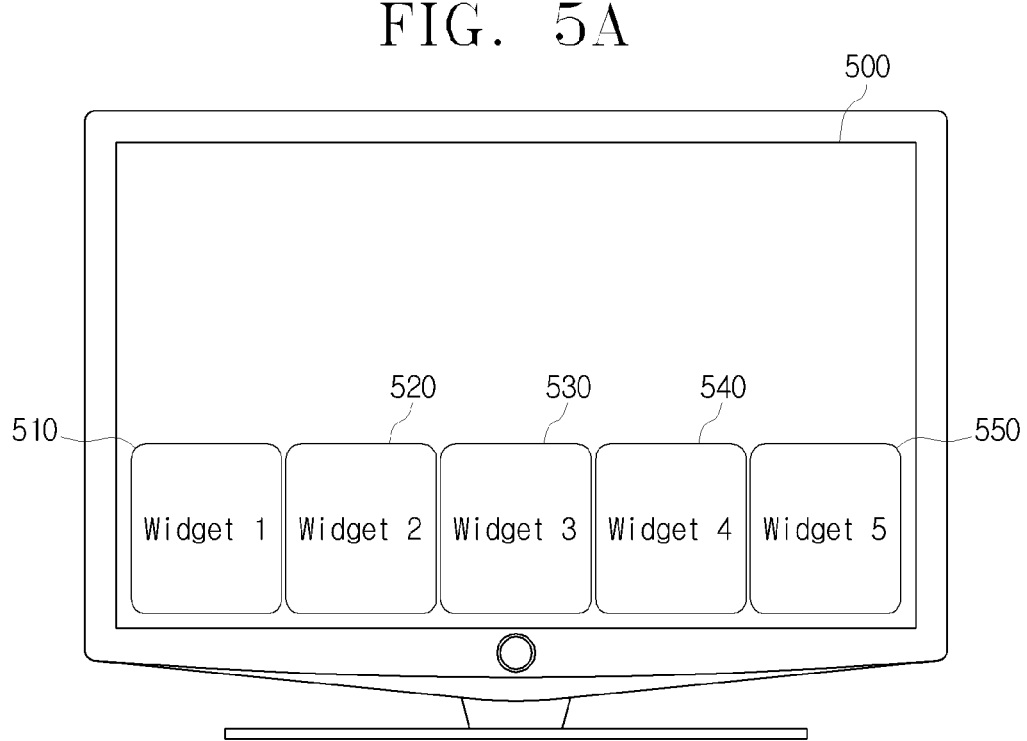
FIGS. 5A to 5B illustrate an example of adding a new widget window onto an existing widget display screen.
Figure 5B:
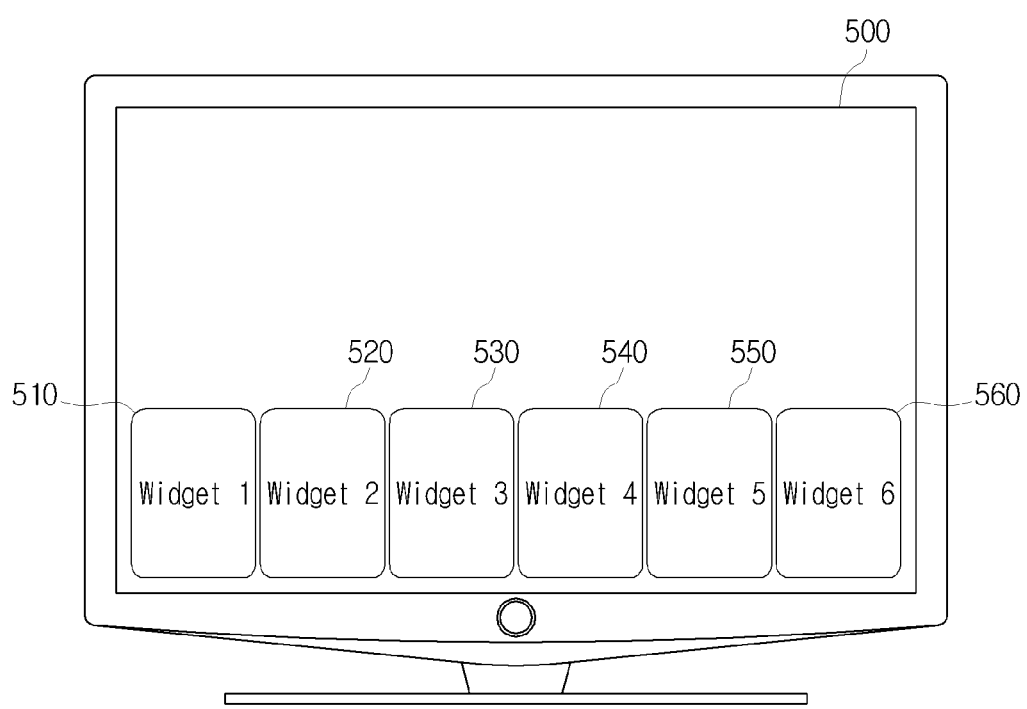

FIGS. 5A to 5B illustrate an example of adding a new widget window onto an existing widget display screen. Before explaining FIGS. 5A to 5B, description of a display apparatus 100 which displays widget windows according to a second embodiment of the present invention is given. The display apparatus 100 includes a generation unit 110, a determination unit 120, a control unit 130, and an input unit 140. The display apparatus 100 has the same configuration as that shown in FIG. 1, but functions differently.

The generation unit 110 generates a widget display screen including at least one widget window. The determination unit 120 determines if a display area of the at least one widget window satisfies a preset threshold condition. If the display area of the at least one widget window satisfies the preset threshold condition, the control unit 130 reduces the display area of the at least one widget window. The input unit 140 receives selection of a widget display pattern from the user.

Unlike the exemplary embodiment of the present invention with reference to FIGS. 1 to 4, if the display area of the at least one widget window satisfies the preset threshold condition, the display apparatus 100 according to the second embodiment of the present invention sets the display area of the at least one widget window not to satisfy the threshold condition by reducing the size of the at least one widget window in the existing display screen. Consequently, the display apparatus 100 can provide the user with diverse services through the at least one widget window without preventing the viewer from viewing the TV.

The size of the at least one widget window on the widget display screen may be reduced at the same rate, or at a different rate so that a widget window of concern is little reduced and the remaining widget windows are largely reduced.

FIG. 5A shows a case that the threshold condition is not satisfied. It is assumed that if a single widget window is added onto the widget display screen 500 of FIG. 5A according to the user's request for adding the widget window, the threshold condition can be satisfied. As shown in FIG. 5B, the widget windows 510 to 550 in the existing display screen 500 are reduced and a new widget window 560 can be added. As described above, the reduction rate of the widget windows 510 to 550 can be adjusted in order not to satisfy the threshold condition even when the new widget window 560 is added. In FIG. 5B, the size of the newly added widget window 560 is the same as that of the reduced widget windows 510 to 550, but the size of the widget windows 510 to 560 can be set diversely so long as the threshold condition is not satisfied.

Unlike FIG. 5A or FIG. 5B, if a widget display screen including widget windows which satisfy the threshold condition is generated by the generation unit 110 from the beginning, the size of widget windows on the widget display screen can be reduced in a certain rate without the user's request for adding a widget window.

Description of the display apparatus 100 which displays widget windows according to the second embodiment of the present invention which overlaps that of FIGS. 1 to 4 is not repeated here.

FIG. 6 is a flow chart illustrating a method for displaying widget windows on a widget display screen according to the second embodiment of the present invention. Referring to FIG. 6, data regarding content to be provided through a widget window are received from an external server (S610). A widget display pattern is selected (S620). A widget display screen including at least one widget window which is arranged according the selected widget display pattern is generated (S630).

It is determined if the generated widget display screen satisfies a preset threshold condition (S640). If the generated widget display screen satisfies the preset threshold condition (S640Y), a display area of the at least one widget window is reduced and thereby a new widget window can be added (S650).

Operation S650 is performed only when a user command to add a widget window is input. If the generated widget display screen does not satisfy the preset threshold condition from the beginning, the display area of the at least one widget window is reduced in operation S650 without adding a new widget window and operation S660 is performed.

In the case that the generated widget display screen does not satisfy the preset threshold condition (S640N), or in operation S650, if one of the widget windows is selected and a signal corresponding to a direction is input using the direction key or wheel key on the remote controller, a content or a content category can vary according to the selected direction (S660).

FIG. 7 is a schematic block diagram of a display system according to an exemplary embodiment of the present invention. Referring to FIG. 7, the display system 700 includes a server 710 and a display apparatus 720.

The server 710 provides the display apparatus 720 with data regarding a content to be executed on a widget window.

The display apparatus 720 receives the data regarding a content to be executed on a widget window, generates a widget display screen including at least one widget window, and determines if a display area of the at least one widget window satisfies a preset threshold condition. If the display area of the at least one widget window satisfies the preset threshold condition, the display apparatus 720 adds a new widget display screen including a new widget window.

Alternatively, the display apparatus 720 receives the data regarding a content to be executed on a widget window, generates a widget display screen including at least one widget window, and determines if a display area of the at least one widget window satisfies a preset threshold condition. If the display area of the at least one widget window satisfies the preset threshold condition, the display apparatus 720 reduces the display area of the at least one widget window.

The server 710 and the display apparatus 720 may be connected via the Internet or intranet using a Transmission Control Protocol/Internet Protocol (TCP/IP). In this case, the server 710 may be a web server including a content database, so the server 710 can store link information on hub sites and provide the display apparatus 720 with the information. In addition, the server 710 can store all information or data regarding contents provided through the widget windows of the display apparatus 720 and provide the display apparatus 720 with the information or data.

If the display apparatus 720 receives data regarding content from the server 710, the display apparatus 720 can receive a user command to convert a normal TV view mode, in which widget windows are not provided, into a widget TV view mode, in which at least one widget window is provided, using an on-screen display (OSD).

As described above, unlike a widget service in a personal computer environment which is provided by driving a widget engine, a kind of application program, the display apparatus 720 according to the exemplary embodiment of the present invention receives information on contents to be executed on widget windows from the external server 710 so that the contents can be executed on the widget windows.

Since such a display apparatus 720 performs the same functions and operations as the display apparatus 100 according to other exemplary embodiments of the present invention, repeated description is omitted here.

As can be appreciated from the above description, if a display area of widget windows or the number of widget windows exceeds a preset threshold value, a new widget display screen including new widget windows is added or new widget windows are added onto an existing widget display screen by reducing the size of the widget windows. Accordingly, services through widget windows can be provided without interfering with the viewer's TV viewing, thereby enhancing user convenience.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A display method, comprising:
   displaying a widget screen including one or more widgets;
   receiving a request to display at least one new widget;
   determining, based on a preset criteria, whether to generate a new widget screen; and
   according to the determining, displaying the new widget on the displayed widget screen or the new widget screen,
   wherein the preset criteria is when a size of a display area of the at least one widget window with respect to the entire widget display screen exceeds a preset threshold rate, wherein the preset criteria is applied in determining whether to display the new widget on the displayed widget screen or whether to generate the new widget screen for the new widget,
   wherein the widget display screen comprises a plurality of icons to change a content category provided by the widget display screen, and
   wherein in response to the one of the plurality of icons is selected changing and displaying different content category based on a direction of the selected icon.

2. The method of claim 1, further comprising:
   alternately displaying the displayed widget screen and the new widget screen according to a user command.

3. The method of claim 1, wherein the preset criteria is at least one of when a number of widget window exceeds a threshold value which represents a number of widget windows allowable in a single widget display screen and when a size of a display area of the at least one widget window with respect to the entire widget display screen exceeds a preset threshold rate.

4. The method of claim 1, further comprising:
   providing a user interface window to ask a user whether to add a new widget screen if the preset criteria indicates that the entire widget display screen exceeds a preset threshold rate.

5. The method of claim 1, further comprising: if one of the at least one widget window is selected and a direction is selected, changing and displaying a content or a content category which is provided by the selected widget window according to the selected direction.

6. The method of claim 1, further comprising:
   receiving selection of a widget display pattern,
   wherein a widget display pattern of the new widget screen is the same as the widget display pattern of the displayed widget screen.

7. The method of claim 1, further comprising receiving a selection of a widget display pattern, wherein:
   a widget display pattern of the new widget screen is the same as the widget display pattern of the displayed widget screen,
   if one of the at least one widget window is selected and a first additional first additional input is received, changing and displaying a first content category provided by the selected widget window based on the first additional input,
   if said one of the at least one widget window is selected and a second additional input is received, changing and displaying a second content category provided by the selected widget window based on the second additional input different from the first additional input, and
   the first content category and the second content category is different.

8. The method of claim 1, further comprising receiving a selection of a widget display pattern for each of the displayed widget screens.

9. The method of claim 1, wherein, when the new widget screen is generated, the displaying comprising displaying a screen, wherein the screen comprises
   the displayed widget screen including said one or more widgets and the new widget screen including the new widget.

10. A display apparatus, comprising: a generating unit which generates a widget screen including one or more widgets; an input unit which receives a request to display at least one new widget;
   a determination unit which determines based on a preset criteria, whether the generating unit is to generate a new widget screen; and
   a control unit which controls to display the new widget on the displayed widget screen or the new widget screen according to the determining, wherein the preset criteria is when a size of a display area of the at least one widget window with respect to the entire widget display screen exceeds a preset threshold rate, wherein the preset criteria is applied in determining whether to display the new widget on the displayed widget screen or whether to generate the new widget screen for the new widget, wherein the widget display screen comprises a plurality of icons to change a content category provided by the widget display screen, and wherein in response to the one of the plurality of icons is selected changing and displaying different content category based on a direction of the selected icon.

11. The apparatus of claim 10, wherein the control unit controls to alternately display the displayed widget screen and the new widget screen according to a user command.

12. The apparatus of claim 10, wherein the preset criteria is at least one of when a number of widget window exceeds a threshold value which represents a number of widget windows allowable in a single widget display screen and when a size of a display area of the at least one widget window with respect to the entire widget display screen exceeds a preset threshold rate.

13. The apparatus of claim 10, wherein the control unit controls to provide a user interface window to ask a user whether to add the new widget screen if the preset criteria indicates that the entire widget display screen exceeds a preset threshold rate.

14. The apparatus of claim 10, wherein if one of the at least one widget window is selected and a direction is selected, the control unit controls to change and display a content or a content category which is provided by the selected widget window according to the selected direction.

15. The apparatus of claim 10, wherein the input unit receives selection of a widget display pattern, and wherein a widget display pattern of the new widget screen is the same as the widget display pattern of the displayed widget screen.

* * * * *